United States Patent

Coleman et al.

[15] 3,645,367
[45] Feb. 29, 1972

[54] OPERATOR FOR CLUTCH AND SYNCHRONIZER BRAKE

[72] Inventors: William S. Coleman; Michael J. McGraw; Lowell W. Syverson, all of Minneapolis, Minn.

[73] Assignee: White Farm Equipment Company

[22] Filed: May 25, 1970

[21] Appl. No.: 40,109

[52] U.S. Cl. .............................. 192/4 A, 192/13 R, 74/339, 188/74
[51] Int. Cl. .......................................................... F16d 67/02
[58] Field of Search ........................... 192/4 A, 13 R; 74/339

[56] References Cited

UNITED STATES PATENTS

| 3,149,498 | 9/1964 | Mack | 192/4 A X |
| 1,230,896 | 6/1917 | Haupt | 192/13 X |
| 1,698,056 | 1/1929 | Jeffries | 192/13 X |
| 1,880,066 | 9/1932 | Barnes | 192/4 A |

Primary Examiner—Benjamin W. Wyche
Attorney—Watts, Hoffmann, Fisher & Heinke

[57] ABSTRACT

A transmission for a tractor which includes an engine crankshaft, a transmission input shaft and first and second clutches between the shafts for transmitting power from the engine crankshaft to the transmission input shaft. An inertia brake assembly is supported adjacent the second clutch with a brakeshoe engageable with the drumlike surface of one member of the second clutch. The brake is actuable from the clutch operating pedal for the first clutch when that pedal is depressed beyond a position in which the first clutch is disengaged. The clutch pedal engages the brake with the second clutch to terminate free rotation of the second clutch, the second clutch output member, the transmission input shaft and gearing in the transmission.

10 Claims, 3 Drawing Figures

PATENTED FEB 29 1972 3,645,367

INVENTORS
WILLIAM S. COLEMAN
MICHAEL J. McGRAW
LOWELL W. SYVERSON
BY Watts, Hoffmann, Fisher & Heinke
ATTORNEYS.

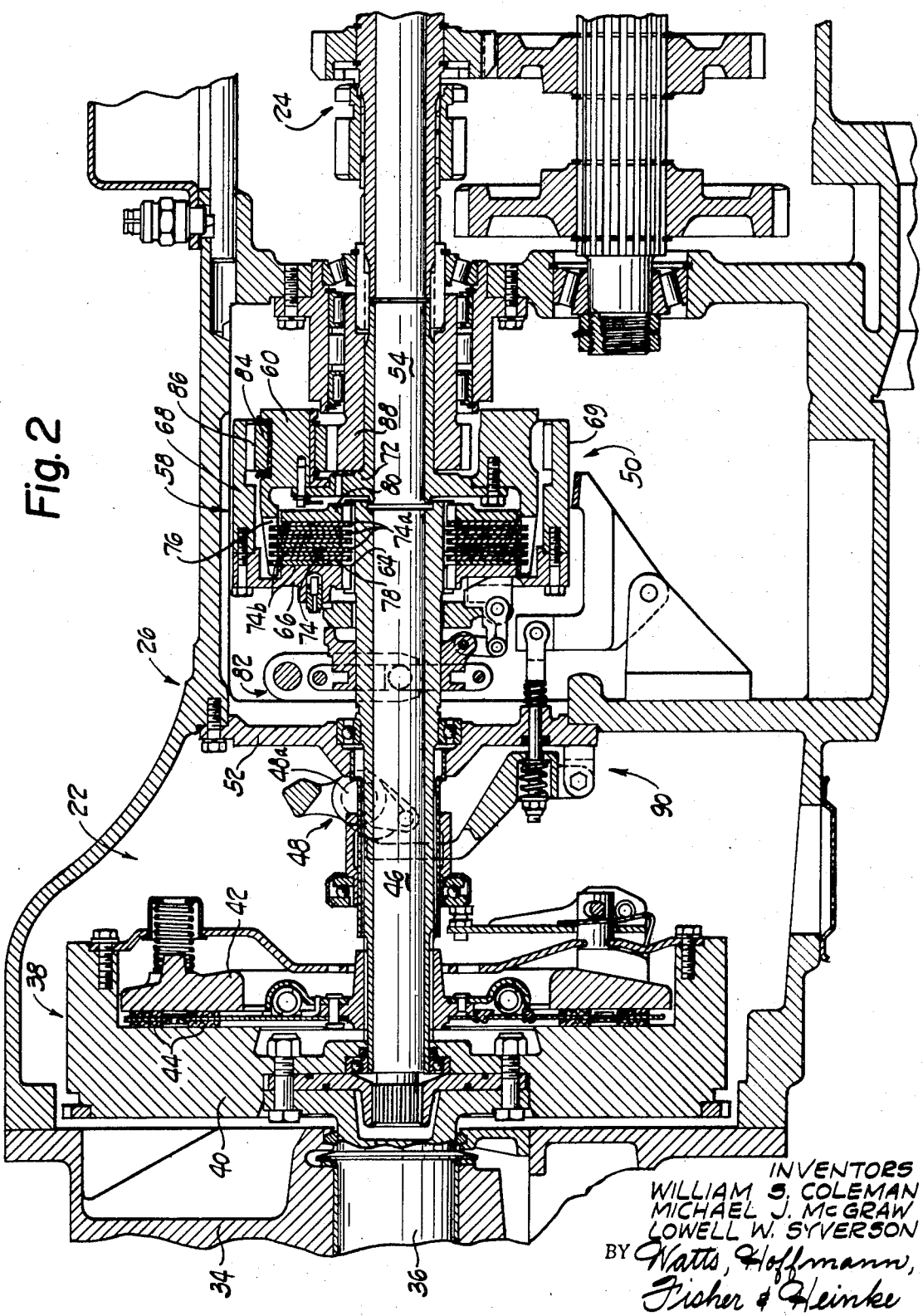

OPERATOR FOR CLUTCH AND SYNCHRONIZER BRAKE

BACKGROUND OF THE INVENTION

1. Field of the Invention

The present invention relates to transmissions and more particularly relates to vehicle transmissions in which power from a prime mover of a vehicle is transmitted to driving wheels through clutches and a change gear arrangement.

2. The Prior Art

Farm tractors and similar vehicles which are not designed for over-the-road use have been provided with change gear transmissions which have not permitted rapid gear shifting These transmissions have usually required the vehicle to be completely stopped with the clutch disengaged and in a neutral gear before the vehicle can be shifted out of neutral to a desired gear. These transmissions have made it somewhat difficult to shift the gears but because of the uses to which these vehicles are put, gear shifting is not required with sufficient frequency to justify more elaborate transmissions which are more easily shifted.

As noted, in most vehicles of the character referred to, changing the driving gear of the vehicle is accomplished by bringing the vehicle to a complete stop in a neutral gear, disengaging the clutch, and then shifting the transmission into the desired gear ratio. Even though the tractor may be completely stopped and the clutch disengaged, the gears in the transmission frequently clash when attempts are made to shift the transmission out of neutral. It has been found that this gear clashing is a result of inertial rotation of components of the transmission which are connected to the output member of a main clutch of the vehicle. When the main clutch is disengaged, these components continue to rotate, or freewheel, for a considerable period of time, e.g., 20 seconds.

The prior art has attempted to prevent gear clashing when such vehicles are shifted out of neutral by employing devices which bear on various parts of the transmission to retard freewheeling of these elements when the main clutch is disengaged and the transmission is in neutral. Many of these prior art devices have not been entirely effective to positively brake spinning elements of the transmissions and accordingly, clashing of gears when attempting to shift from neutral has remained a problem.

When the load on a tractor is increased, as when a plow or other implement commences to be pulled through wetter soil, it is often necessary to change the gear ratio. If the gear change can be effected quickly, it not only is advantageous from the standpoint of saving time, but also from the standpoint of maintaining momentum.

When a tractor is driven onto or across a highway, shifting the transmission to provide maximum tractor speed is usually desired. When highway traffic is encountered, the inability to shift gears quickly can create a traffic safety hazard.

SUMMARY OF THE INVENTION

The present invention provides a new and improved brake for positively terminating the rotation of transmission components when the main clutch is disengaged. This minimizes the time required to shift gears as well as possible damage to the gears or wear which is occasioned by clashing the gears.

In a preferred embodiment of the invention, the new brake is supported adjacent a member having a cylindrical peripheral surface defining a brakedrum. The inertia brake is linked to a clutch pedal of the vehicle so that after the main clutch is disengaged, the inertia brake is operated to positively engage a brakeshoe with the brakedrum. Preferably, the brakeshoe is carried by a rigid link which is actuated from the clutch pedal through a spring cushion. Hence, the brakeshoe can be applied against the brakedrum under a relatively large force to provide a large frictional force between the shoe and drum.

The brakedrum is preferably formed by a member of a secondary clutch of the vehicle and the brakedrum is of relatively large diameter. Because of the diameter of the brakedrum surface defined by the secondary clutch member, the moment arm through which the braking force acts on the spinning transmission parts is relatively large. Hence, although the secondary clutch increases the inertia of the transmission parts somewhat, the braking torque applied to these freely rotating transmission parts is relatively great and more than offsets the effect of the secondary clutch on the transmission inertia. Accordingly, these parts are promptly stopped to permit the transmission to be shifted from one condition to another in a minimum amount of time and without clashing the gears.

A principal object of the present invention is the provision of a new and improved vehicle transmission for tractors or the like employing an inertia brake for components of the transmission which is capable of applying a relatively large braking torque to the components to abruptly stop freewheeling of transmission components when the main clutch is disengaged.

Other objects of the invention will be apparent from the following detailed description thereof made with reference to the accompanying drawings which form a part of the specification.

BRIEF DESCRIPTION OF THE DRAWINGS

FIG. 2 is a fragmentary cross-sectional view of the clutches and transmission of the vehicle shown in FIG. 1; and, FIG. 3 is a fragmentary cross-sectional view of an inertia brake arrangement constructed according to a preferred embodiment of the invention.

DESCRIPTION OF A PREFERRED EMBODIMENT

Figure 1:
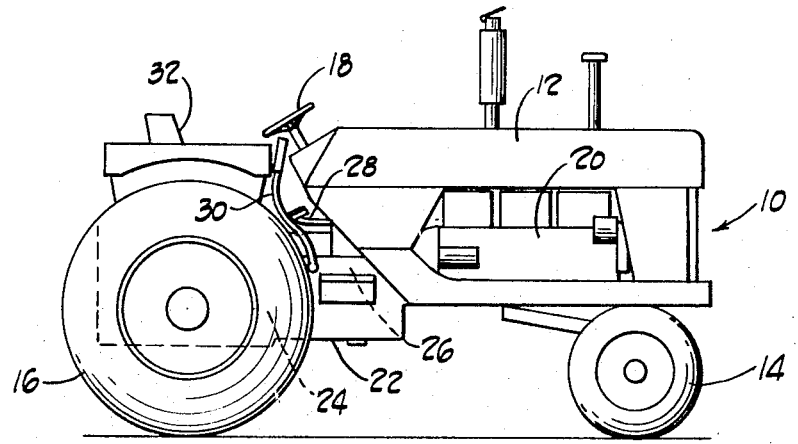
FIG. 1 is a schematic illustration of a vehicle embodying the present invention.

A tractor 10 embodying the present invention is schematically illustrated in FIG. 1. The tractor 10 includes a body 12 which is supported by ground engaging pairs of wheels 14, 16, respectively. The wheels 14 are steerable front wheels which are steered by a steering wheel 18. The rear wheels 16 propel the tractor 10 along the ground and are driven from the tractor engine 20 through a clutch arrangement 22 and a change gear transmission 24. The clutch arrangement and transmission are supported in a suitable housing generally indicated at 26 (FIG. 1).

A main clutch operating pedal 28 and a gear shift lever 30 project from the housing 26 adjacent the steering wheel 18 and an operator's seat 32 so that operation of the tractor 10 is controllable by an operator seated on the seat 32. The transmission 24 may be of any suitable or conventional type and therefore is not disclosed in detail. Suffice it to say that the transmission is capable of providing at least two forward gear ratios, or "gears," a neutral gear in which the engine 20 and the wheels 16 are disengaged, and a reverse gear in which the wheels 16 are driven to propel the tractor 10 rearwardly.

Referring now to FIG. 2, a fragmentary cross-sectional view of a portion of the housing 26 surrounding the clutch arrangement 22 is illustrated.

The housing 26 includes a crankshaft housing 34 supporting an engine crankshaft 36. A flywheel and main clutch assembly 38 is located adjacent the crankshaft housing 34 and includes a flywheel 40, an input clutch member 42 and output friction discs 44 supported between the flywheel 40 and the input clutch member 42. The input clutch member 42 is engaged to transmit drive from the crankshaft 36 to a driven or clutch shaft 46 through the clutch members.

A throwout mechanism 48 is associated with the input clutch member 42 to move that member out of engagement with the output friction discs 44 thus disengaging the input clutch member 42. The throwout mechanism 48 is operated from the main clutch pedal 28 of the vehicle. When the clutch pedal 28 is depressed, a shaft 48a, which is driven from the clutch pedal, is rotated to move a pressure plate in the input clutch member 42 towards the right as seen in FIG. 2 thereby disengaging the clutch.

The input clutch member 42 is bolted to the flywheel 40 and transmits power to the output friction discs 44 by means of a spring loaded pressure plate. The transmission of power from the input clutch 42 to the output friction discs 44 can be cut off by moving the pressure plate away from the friction discs 44 by means of a lever in the input clutch 42 which is actuated by the throwout mechanism 48.

The friction discs 44 are splined to the shaft 46 enabling limited movement of these discs axially of the shaft 46 while preventing the output shaft from rotating relative to the friction discs. Although one particular main clutch is shown and described, the assembly 38 may be of any suitable or conventional type.

The clutch shaft 46 extends from the output friction discs 44 to a secondary clutch 50 through an annular bearing support plate 52 which is fixed in the housing 26. The secondary clutch 50 connects the clutch shaft 46 to the transmission input shaft 54. The secondary clutch is normally engaged so that whenever the flywheel and main clutch assembly 38 is engaged, the transmission 24 is driven from the engine crankshaft 36 through the flywheel and main clutch assembly 38, the clutch shaft 46, the secondary clutch assembly 50 and the transmission input shaft 54.

The secondary clutch 50 is defined by an input member 58 drivingly connected to the shaft 46 and output members 60 and 72 connected to the transmission input shaft 54. The input member 58 is connected to the shaft 46 by a spline 64 and includes a hublike body portion 66 and a cylindrical drum member 68. The drum member 68 defines a continuous relatively smooth cylindrical external surface 69, the purpose of which is described presently.

The output member 60 of the clutch is defined by a cage or carrier of a planetary gear arrangement described presently. The cage 60 is screwed to a flange 72 of the input shaft 54 so that the shaft 54 is driven by the cage 60. A plurality of friction discs 74 are disposed between the input member 58 and the output member 60. The discs 74 are interleaved with alternate discs 74a being splined to the shaft 46 and the remaining discs 74b splined to projecting portion 76 of the output member 60. The discs 74 are confined between a pressure pad or surface 78 on the input member 58 and a rigidly supported annular keeper 80 fixed to the shaft 46.

A throwout mechanism generally designated at 82 cooperates with the input member 58 to urge the input member to the right as viewed in FIG. 2. This establishes pressure engagement between adjacent friction discs 74 so that torque is transmitted from the shaft 46 through the engaged discs 74 and to the output member 60. The throwout mechanism 82 may be of any suitable construction and therefore is not described in detail.

As noted, the output member 60 defines a cage or carrier for a series of planet gears only one of which is illustrated at 84. The planet gears are free to rotate about their axes with respect to the output member 60 and the teeth of these planet gears mesh with the internal teeth of a ring gear 86 formed in the member 68. A sun gear 88 is supported by two needle bearings 121 which are in turn supported by a stationary housing 123. A one-way overrunning sprag clutch 122 allows the sun gear 88 to rotate freely when the power is transmitted through the discs 74, but holds the sun gear 88 stationary when the power is transmitted through the planetary gears. When the secondary clutch 50 is engaged, the output member and transmission input shaft 54 are directly driven from the shaft 46 through the friction discs 74. When the clutch 50 is disengaged, the transmission input shaft 54 is driven through the planetary gear system. This enables the transmission to be operated either through its friction discs 74 or through its planetary gear system 84, 86, 88 thereby obtaining two speed ranges.

From the foregoing description, it can now be seen that when the input clutch member 42 is disengaged with the transmission in neutral, the output clutch discs 44, the clutch shaft 46, the secondary clutch assembly 50 and the transmission input shaft 54 tend to rotate due to inertia. When this occurs, gears associated with the transmission input shaft 54 likewise tend to rotate. If the transmission is attempted to be shifted out of neutral, spinning gears in the transmission could clash and prevent shifting.

Figure 3:
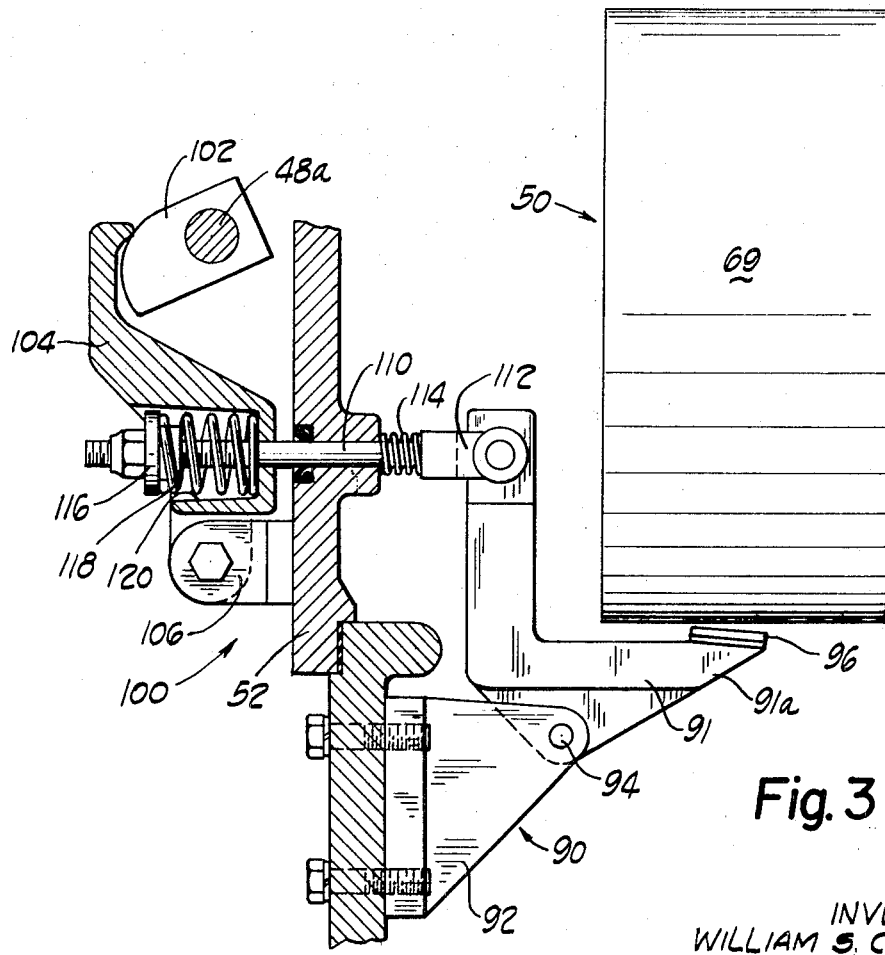

According to the present invention, an inertia brake 90 is provided for positively terminating the inertial rotation of the aforementioned parts when the input clutch member 42 is disengaged and the transmission is in a neutral gear. The new inertia brake 90 is illustrated in FIG. 3.

The brake 90 includes a link member 91 which is rotatably supported in the housing 26 adjacent the secondary clutch assembly 50 by a pivot support 92. The pivot support 92 carries a pivot pin 94 which extends through the support 92 and the link 91 enabling the link 91 to rotate about the axis of the pivot pin 94.

The link 91 is a generally L-shaped member and carries a brakeshoe 96 at the end of its leg 91a. The brakeshoe is disposed adjacent the outer cylindrical surface 69 on the input member of the secondary clutch assembly 50. When the link 91 is rotated counterclockwise as seen in FIG. 3, the brakeshoe 96 is moved into engagement with the surface 69. The clutch input member 58 thus defines a brakedrum on which the shoe 96 acts.

A brake actuating linkage 100 rotates the link 91 about the pivot pin 94 to engage and disengage the brakeshoe in response to operation of the clutch pedal 28. The linkage 100 includes a cam 102 which is fixed to the main clutch throwout shaft 48a. The cam 102 engages a lever 104 which is pivotally connected to the bearing plate 52 by a hinge 106.

A stud 110 extends through the lever 104 and the bearing plate 52 to the leg 91b of the link 91. The stud 110 and the link 91 are pivotally connected by a clevice 112 enabling the link 91 to be rotated about its pivot pin in response to movement of the stud along its axis through the bearing plate 52. A return spring 114 is disposed in compression between the clevice and the bearing plate 52 for urging the brakeshoe away from the engaged position.

The stud 110 extends through an opening in the lever 104 and is preferably connected to the lever 104 by a lost motion connection including a retainer 116 and spring 118. The spring 118 is disposed in a spring retaining cavity 120 in the lever.

The cam 102 oriented with respect to the shaft 48a so that the lever 104 remains substantially stationary as the clutch pedal is depressed through about two-thirds of the distance of its travel. At this point, the input clutch 42 is disengaged. As the clutch pedal continues to be depressed, the cam 102 engages the lever 104 and moves the lever counterclockwise about the hinge 106. Rotation of the lever 104 counterclockwise overcomes the force of the spring 114 and moves the link 91 counterclockwise to engage the brakeshoe 96 with the brakedrum 69.

The spring 118 is relatively stiff and accordingly a large engaging force is provided between the brakeshoe and the drum causing freely rotating elements of the transmission to stop abruptly. The spring 118 is deflectable to cushion or limit the force transmitted to the link 91, which might otherwise damage or destroy the link.

After the transmission has been shifted out of neutral, the clutch pedal 28 is slowly released causing the cam 102 to rotate counterclockwise as seen in FIG. 3. The spring 114 urges the link 91 clockwise about its pivot pin 94 to disengage the brake. The lever 104 follows the cam under the influence of the spring 114.

It is apparent that the input clutch 42 is not engaged until after the inertia brake is released from the secondary clutch assembly thus eliminating unnecessary wear on the brakeshoe.

While only a single embodiment of the present invention has been illustrated and described, the present invention is not to be considered to be limited to the precise construction shown but rather to all adaptations, modifications and uses which come within the scope of the appended claims.

What is claimed is:

1. In a vehicle having an engine, a change gear transmission and first and second clutches connected between said engine and said transmission:
   a. a throwout mechanism for engaging and disengaging said first clutch;
   b. brake means adjacent said second clutch comprising a brakeshoe engageable with a member of said second clutch and a pivotable brakeshoe supporting member supported by a housing for said clutches.
   c. brake actuating means connected to said throwout mechanism and operable to engage said brakeshoe with said member of said second clutch after said first clutch is disengaged;
   d. said brake actuating means comprising:
      1. a lever supported in said housing;
      2. a member connected between said lever and said brakeshoe supporting member; and,
      3. a cam fixed to a movable member of said throwout mechanism;
      4. said lever including a cam follower portion engaging said cam during movement thereof.

2. In a vehicle as claimed in claim 1 wherein said throwout mechanism for said first clutch includes a shaft rotatable to disengage said first clutch, said cam of said actuating means fixed to said shaft.

3. In a vehicle as claimed in claim 1 wherein said member of said second clutch defines an external cylindrical brakedrum surface for engagement by said brakeshoe.

4. In a vehicle as claimed in claim 1 and further including a spring supported between said lever and said connecting member for cushioning the force transmitted to said brakeshoe supporting member.

5. In a vehicle as claimed in claim 4, further including a second spring supported between said brakeshoe supporting member and a part of said housing for urging said brakeshoe away from said member of said second clutch.

6. In a vehicle having an engine, a change gear transmission and a clutch connected between said engine and said transmission:
   a. a throwout mechanism for engaging and disengaging said clutch;
   b. brake means for terminating rotation of parts of said transmission when said clutch is disengaged;
   c. said brake means comprising a member connected to said transmission defining an external cylindrical brakedrum surface and a brakeshoe supporting member positioned adjacent said brakedrum and movable toward and away from said brakedrum surface;
   d. structure supporting said brakeshoe supporting member for movement relative to said brakedrum; and,
   e. cam means connected so said throwout mechanism for moving said brakeshoe supporting member in sequence with operation of said throwout mechanism.

7. In a vehicle as claimed in claim 8 wherein said brakedrum is defined by a member of a secondary clutch.

8. In a vehicle as claimed in claim 6 wherein said cam means comprises a cam member attached to said throwout mechanism and a lever movable by said cam member to effect movement of said brakeshoe supporting member.

9. In a vehicle as claimed in claim 8 further including spring means reacting against said lever to oppose movement thereof by said cam member, said spring means urging said lever toward a position wherein said brakeshoe is disengaged from said brakedrum surface.

10. In a vehicle as claimed in claim 8 wherein said brake means is disposed adjacent one side of a housing wall and said cam member and said lever are disposed on an opposite side of said wall, and further including a motion transmitting member extending through said housing wall between said lever and said brakeshoe supporting member.

* * * * *